United States Patent
Herzog (10) Patent No.: US 7,326,863 B2
(45) Date of Patent: *Feb. 5, 2008

(54) HINGE FOR CABLE TROUGH COVER

(75) Inventor: Daniel M. Herzog, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/276,594

(22) Filed: Mar. 7, 2006

(65) Prior Publication Data

US 2006/0191701 A1 Aug. 31, 2006

Related U.S. Application Data

(63) Continuation of application No. 10/776,678, filed on Feb. 10, 2004, now Pat. No. 7,041,897.

(51) Int. Cl.
*H02G 3/04* (2006.01)

(52) U.S. Cl. ............ 174/480; 174/481; 174/68.1; 174/68.3; 52/287.1

(58) Field of Classification Search ........ 174/480, 174/481, 482, 500, 68.1, 68.3, 50, 72 A, 174/135, 95, 99 R, 96, 97, 101, 98; 385/134, 385/135; 52/220.3, 220.5, 220.7, 287.1; D13/155

See application file for complete search history.

(56) References Cited

U.S. PATENT DOCUMENTS 3,786,171 A 1/1974 Shira (Continued)

FOREIGN PATENT DOCUMENTS

| EP | 1 033 800 A1 | 9/2000 |
|---|---|---|
| EP | 1 284 535 A1 | 2/2003 |
| EP | 1 317 040 A1 | 6/2003 |
| FR | 2 406 327 | 5/1979 |
| FR | 2 425 518 | 12/1979 |
| GB | 1021871 | 3/1966 |
| WO | WO 95/28757 | 10/1995 |
| WO | WO 02/18992 A1 | 3/2002 |
| WO | WO 02/29463 A1 | 4/2002 |

OTHER PUBLICATIONS

"FiberGuide® System Installation Manual," *ADC Telecommunications, Inc.*, ADCP-95-005, Issue 1, front cover, pp. i-viii, pp. 5-2 to 5-15, and back cover (Sep. 2002).

(Continued)

*Primary Examiner*—Angel R. Estrada
(74) *Attorney, Agent, or Firm*—Merchant & Gould P.C.

(57) ABSTRACT

Systems and methods for covering a trough member. A system can include a hinge clip coupled to a sidewall of the trough member and having arms creating a socket. The system can include a cover including a pivot member and a groove at one end. The pivot member can be received in the socket to allow the cover to pivot about the pivot member from open to closed positions, and one arm of the socket can be received in the groove in the open position. A capture clip including a ramp portion and a seat can be coupled to the other sidewall, and another pivot member at the other end of the cover can ride along the ramp and drop into the seat as the cover is pivoted from open to closed positions. The cover can also be two cover portions, each extending partially over the trough member and creating a slot therebetween. The hinge clip can include structures to limit rotation of the cover, and structures to capture portions of the cover.

4 Claims, 11 Drawing Sheets

U.S. PATENT DOCUMENTS

| | | |
|---|---|---|
| D269,968 S | 8/1983 | Moura |
| 4,406,379 A | 9/1983 | Anderson et al. |
| 4,423,284 A | 12/1983 | Kaplan |
| 4,634,019 A | 1/1987 | Pherigo |
| 4,640,314 A | 2/1987 | Mock |
| 4,942,271 A | 7/1990 | Corsi et al. |
| 5,004,192 A | 4/1991 | Handler |
| 5,134,250 A | 7/1992 | Caveney et al. |
| 5,235,136 A | 8/1993 | Santucci et al. |
| 5,669,106 A | 9/1997 | Daoud |
| 5,728,976 A | 3/1998 | Santucci et al. |
| 5,942,729 A | 8/1999 | Carlson, Jr. et al. |
| 6,084,180 A | 7/2000 | DeBartolo, Jr. et al. |
| 6,107,575 A | 8/2000 | Miranda |
| 6,107,576 A | 8/2000 | Morton et al. |
| D430,543 S | 9/2000 | Rohder |
| 6,288,331 B1 | 9/2001 | Wirthwein et al. |
| 6,333,461 B1 | 12/2001 | Marcou et al. |
| 6,348,660 B1 | 2/2002 | Gutgsell et al. |
| 6,380,484 B1 | 4/2002 | Theis et al. |
| 6,437,243 B1 | 8/2002 | VanderVelde et al. |
| 6,437,244 B1 | 8/2002 | Vander Velde |
| 6,459,038 B1 | 10/2002 | Waszak et al. |
| 6,476,327 B1 | 11/2002 | Bernard et al. |
| D473,850 S | 4/2003 | Rouleau et al. |
| 6,668,123 B1 | 12/2003 | Ellison et al. |
| 6,677,533 B2 | 1/2004 | Bernard et al. |
| 6,693,238 B2 | 2/2004 | Jadaud et al. |
| 6,792,877 B2 | 9/2004 | Gutgsell et al. |
| 6,803,519 B2 | 10/2004 | de la Borbolla et al. |
| 6,810,191 B2 | 10/2004 | Ferris et al. |
| 6,835,891 B1 | 12/2004 | Herzog et al. |
| RE38,709 E | 3/2005 | Gutgsell et al. |
| 6,903,265 B1 | 6/2005 | VanderVelde et al. |
| 6,916,986 B1 | 7/2005 | Herzog et al. |
| 6,972,367 B2 | 12/2005 | Federspiel et al. |
| 7,041,897 B2 * | 5/2006 | Herzog ............ 174/500 |
| 7,041,912 B2 | 5/2006 | Kadrnoska et al. |
| 7,060,901 B2 * | 6/2006 | Herzog et al. ....... 174/68.1 |
| 2003/0016931 A1 | 1/2003 | Ferris et al. |
| 2003/0047345 A1 | 3/2003 | Bernard et al. |
| 2003/0089515 A1 | 5/2003 | Federspiel et al. |
| 2004/0218884 A1 | 11/2004 | Ferris et al. |

OTHER PUBLICATIONS

"FibreGuide® Fiber Management Systems," *ADC Telecommunications, Inc.*, 1st Edition, front cover, pp. 20, 26, 32 and back cover (Mar. 2002).

"Lightpaths, Fibre Optic Management Systems," *Warren & Brown & Staff*, Issue 2, 11 pages (1995).

ADC FiberGuide® System Installation Manual; ADCP-95-005, Issue 1; 1045660 Rev A; front cover; preface pp. ii-viii; pp. 5-2-5-15; rear cover; Sep. 2002.

U.S. Appl. No. 10/703,157, entitled "Cover for Cable Trough" filed Nov. 5, 2003.

\* cited by examiner

HINGE FOR CABLE TROUGH COVER

RELATED APPLICATION

This application is a continuation of U.S. patent application Ser. No. 10/776,678 filed on Feb. 10, 2004 now U.S. Pat. No. 7,041,897, the entirety of which is hereby incorporated by reference.

TECHNICAL FIELD

The present invention relates to systems and methods for the management and routing of telecommunication cables, and, more particularly, to covers for cable trough members.

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; and 5,752,781 teach cable routing systems that include a plurality of trough members and couplers.

Various concerns arise in the use of trough members. One concern is that trough members are typically U-shaped and therefore have open tops through which debris and other undesirable material, such as tools, hardware, and other debris, can fall onto the fibers running through the trough members. Further, even if the trough members include covers to close the open tops, it may be necessary to periodically gain access to the interior portions of the trough members to, for example, add or remove fibers.

It is therefore desirable to provide covers for trough members that reduce debris from entering interior portions of the trough members while still allowing for access to the interior portions of the trough members.

SUMMARY

Embodiments of the present invention are directed to systems and methods for the management and routing of telecommunication cables and, more particularly, to covers for cable trough members. Generally, the covers can be coupled to the trough members to cover the trough members. In addition, the covers can be pivoted with respect to the trough members to provide access to the interior portions of the trough members.

In accordance with one aspect, a system includes at least one hinge clip coupled to a trough member to allow the trough member to pivot from an open position to a closed position. A capture clip can also be provided on the trough member to hold the cover in the closed position.

In accordance with another aspect, a system includes two cover portions, which are each coupled to opposite sidewalls of a trough member by hinge clips. Each cover portion can extend partially across an open portion of the trough member, and the cover portions, in the closed position, can define therebetween a slot.

One preferred embodiment of a hinge clip includes first and second structures for limiting the amount of rotation of the cover beyond the open and closed positions. The preferred embodiment further includes a capture element for capturing a portion of the cover when the cover is in the closed position.

The above summary of the present invention is not intended to describe each disclosed embodiment or every implementation of the present invention. Figures in the detailed description that follow more particularly exemplify embodiments of the invention. While certain embodiments will be illustrated and described, the invention is not limited to use in such embodiments.

DETAILED DESCRIPTION OF THE PREFERRED EMBODIMENT

Embodiments of the present invention are directed to covers for cable trough members. Generally, the covers can be coupled to the trough members to cover the trough members. In addition, the covers can be pivoted with respect to the trough members to provide access to the interior portions of the trough members. As used herein, the term trough member is used to refer to any trough, fitting, railway, raceway, or similarly configured component including any number of ends.

Referring now to FIGS. 1-5, an example embodiment of a cable trough system 100 is shown. The system 100 generally includes a trough member 110, a hinge clip 130, a capture clip 150, and a cover 170. In preferred embodiments, the clips 130 and 150 can be coupled to the trough member 110 to hold the cover 170, and the hinge clip 130 can allow the cover 170 to pivot relative to trough member 110 between closed and open positions. For example, as described further below, the cover 170 is illustrated in the closed position in FIGS. 1-3 and in the open position in FIGS. 4 and 5.

The example trough member 110 includes first and second sidewalls 112 and 116 coupled to a bottom wall 114 generally forming a trough with an interior space 118 through which cables such as fiber (e.g., fiber cables 101 shown in FIG. 1) can be run. The trough member 110 also includes lips 310 and 311 creating a first slot 113 and lips 312 and 313 creating a second slot 117 positioned on the first and second sidewalls 112 and 116, respectively. The lips 310, 311 and 312, 313 and first and second slots 113 and 117 created thereby can be used to allow components to be attached to the trough member 110, as described further below.

The trough member 110 extends lengthwise from a first end 120 to a second end (not shown). The trough member 110 can be of varying lengths and widths, and can be coupled to other trough members or similar structures to form a cable trough system.

The example hinge clip 130, shown in more detail in FIGS. 2, 5, and 6-8, includes first and second members 133 and 134 creating a channel 131 to receive the lip 310, and a clip portion 132 extends partially into the first slot 113 to couple the hinge clip 130 to the first sidewall 112 of the trough member 110. The hinge clip 130 further includes a hinge portion 135 having first and second arms 136 and 137 creating a socket 138.

The hinge clip 130 can be coupled to the trough member 110 as shown in FIGS. 1, 2, 4, and 5, so that the channel 131 receives the lip 310, and the clip portion 132 extends partially into the slot 113. Preferably, the hinge clip 130 is coupled to the sidewall 112 by snapping the hinge clip 130 onto a mid-portion of the trough member 110. This can be accomplished by positioning the channel 131 adjacent to the end of the sidewall 112, and applying a downward force on the hinge clip 130 to cause the first member 133 to bow out slightly with respect to the second member 134 to allow the lip 310 to be received in the channel 131 and to allow the clip portion 132 to extend partially into the slot 113.

In alternative embodiments, the hinge clip 130 can be configured to be coupled to the sidewall 112 by sliding the hinge clip 130 onto an end, such as first end 120 of the trough member 110, and into the desired position on the trough member 110. If the hinge clip 130 is configured to be slid onto the trough member 110, additional structure can be provided for fixing the hinge clip 130 in a desired position on the trough member 110 such as, for example, screws or bolts, as described further below.

The hinge clip 130 can be removed from the trough member 110 similarly, either by forcing the clip portion 132 out of the slot 113 and then removing the hinge clip 130 from the trough member 110, or, alternatively, by sliding the hinge clip 130 off an end of the trough member 110.

The hinge clip 130 extends from a first end 140 to a second end 142. In preferred embodiments, the length of the hinge clip 130 (i.e., the distance between ends 140 and 142) is between 1 and 5 inches. In a preferred embodiment, the length is approximately 1.75 inches. The hinge clip 130 is preferably molded from a plastic material such as, for example, a synthetic thermoplastic polymer such as an acrylonitrile-butadiene-styrene(ABS)/polycarbonate blend. In a preferred embodiment, the hinge clip 130 is injection molded and varies in thickness from one end to the other to allow the molded clip to be stripped from the mold. Other manufacturing methods and materials can also be used.

Figure 3:
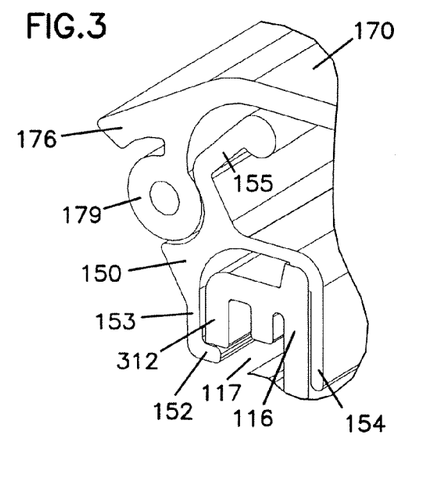
FIG. 3 is an enlarged view of another portion of the trough system shown in FIG. 1.
Figure 4:
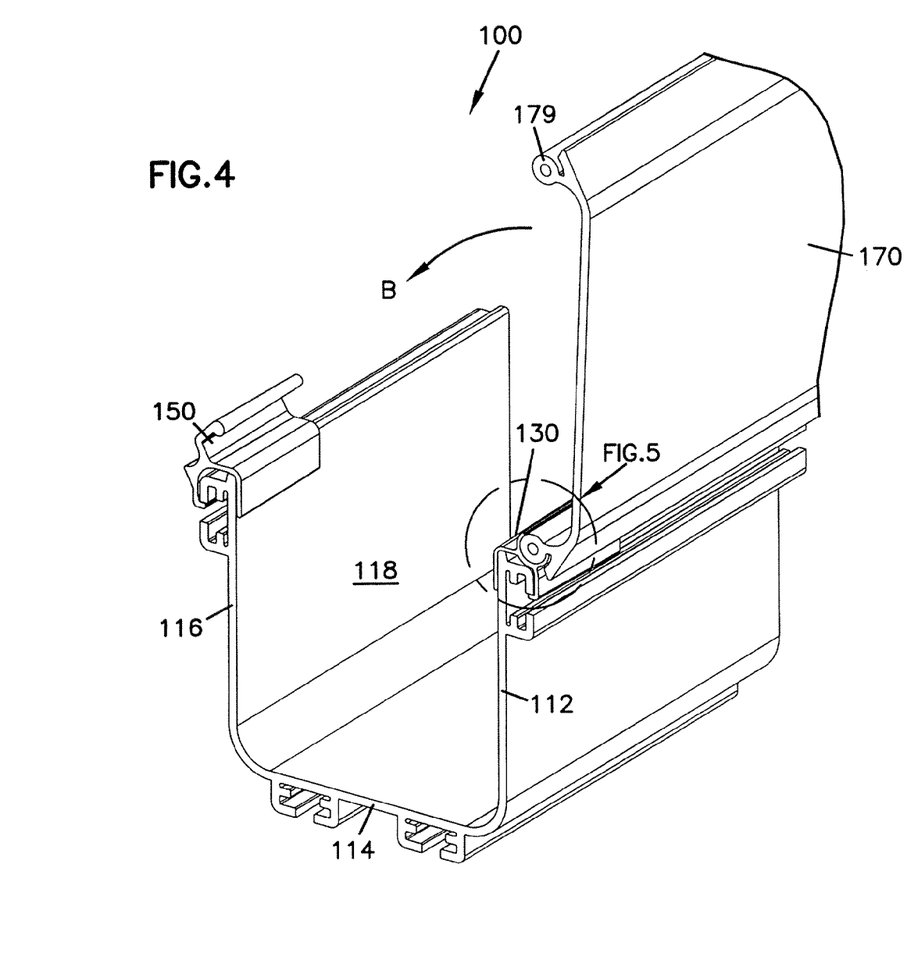
FIG. 4 is a perspective view of the trough system of FIG. 1 with the cover in an open position.
Figure 5:
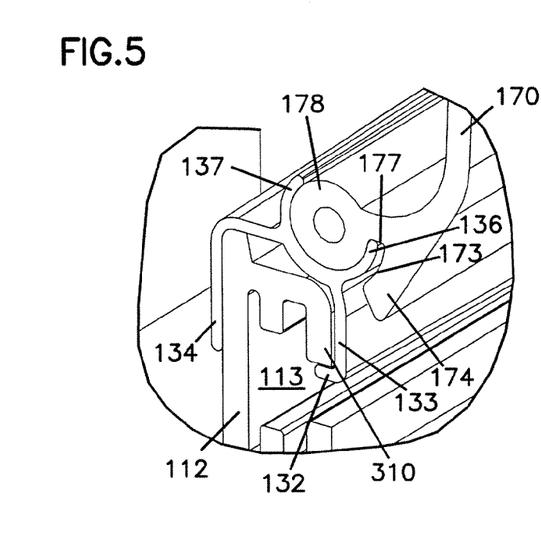
FIG. 5 is an enlarged view of a portion of the trough system shown in FIG. 4.
Figure 6:
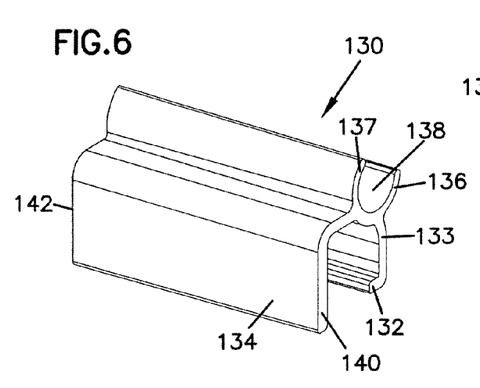
FIG. 6 is a perspective view of an embodiment of a hinge clip made in accordance with the present invention.
Figure 7:
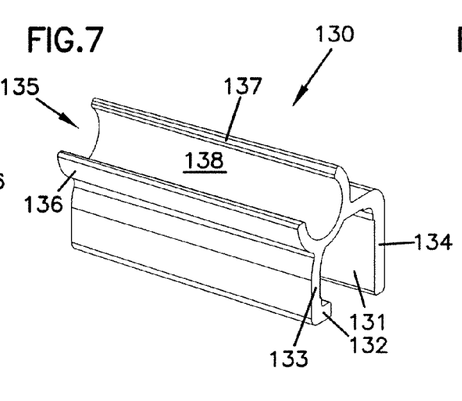
FIG. 7 is another perspective view of the hinge clip of FIG. 6.
Figure 8:
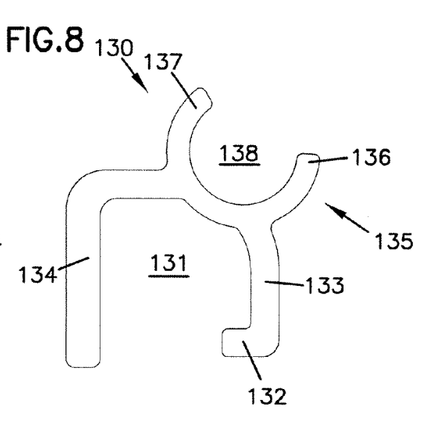
FIG. 8 is an end view of the hinge clip of FIG. 6.
Figure 9:
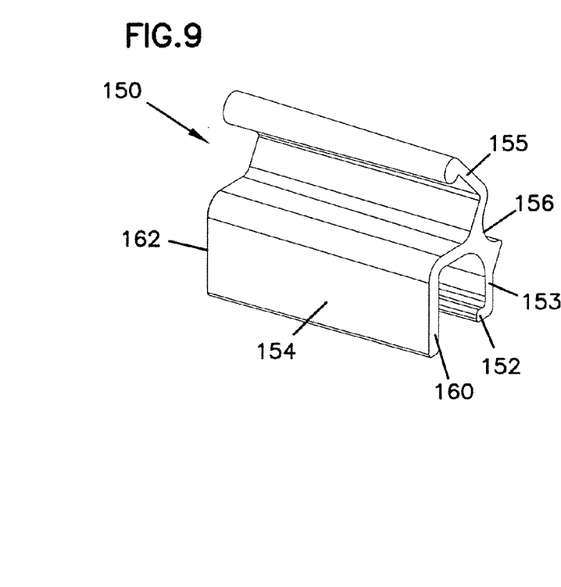
FIG. 9 is a perspective view of an embodiment of a capture clip made in accordance with the present invention.
Figure 10:
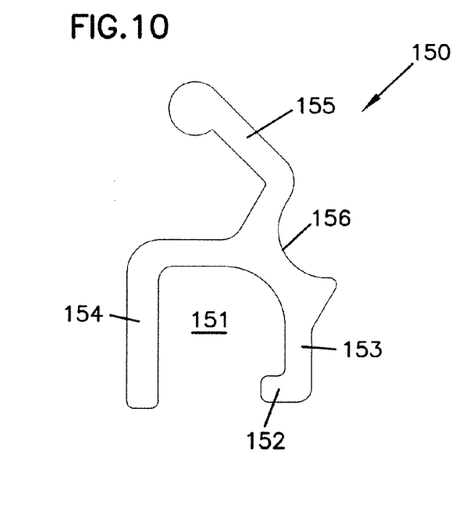
FIG. 10 is an end view of the capture clip of FIG. 9.
Figure 11:
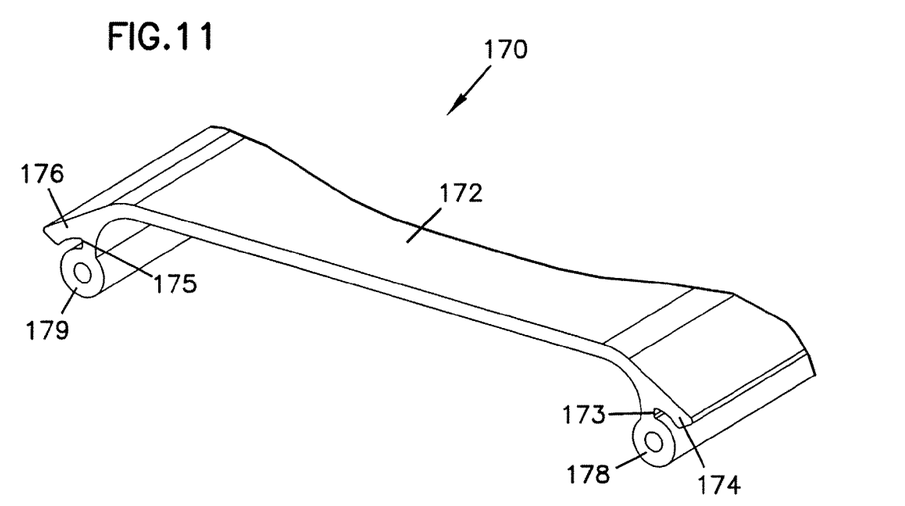
FIG. 11 is a perspective view of an embodiment of a cover made in accordance with the present invention.
Figure 12:
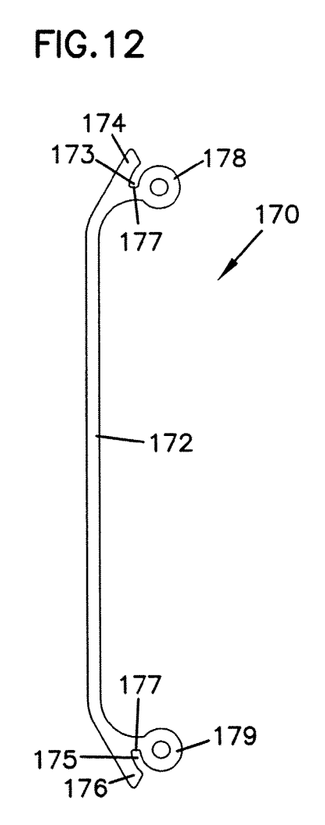
FIG. 12 is an end view of the cover of FIG. 11.
Figure 13:
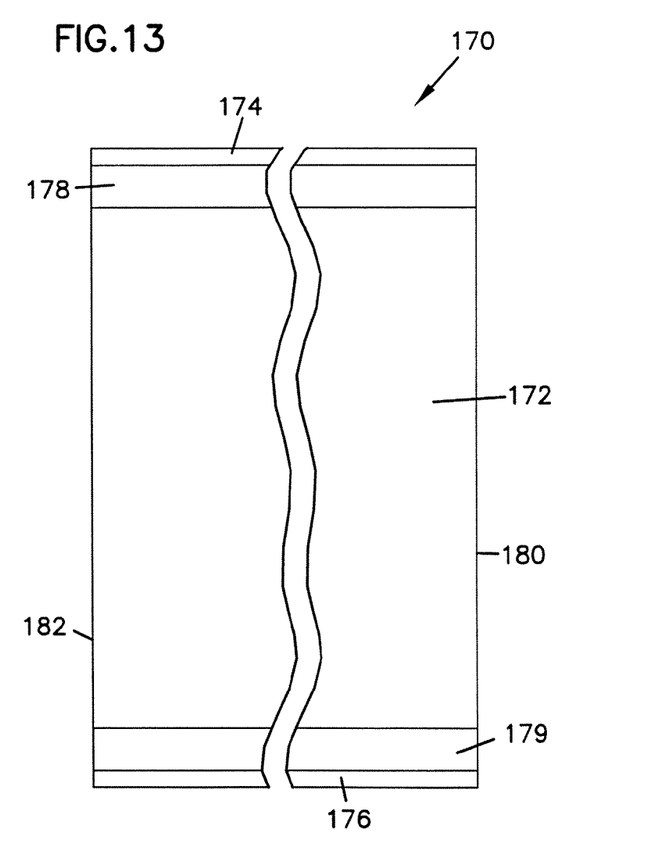
FIG. 13 is a bottom view of the cover of FIG. 11.

The example capture clip 150, shown in more detail in FIGS. 3, 9, and 10, includes first and second members 153 and 154, creating a channel 151 to receive the lip 312, and a clip portion 152 extending partially with the slot 117 to couple the hinge clip 150 to the second sidewall 116 of the trough member 110. The hinge clip 150 further includes a ramp portion 155 and a seat 156, as described further below.

Figure 1:
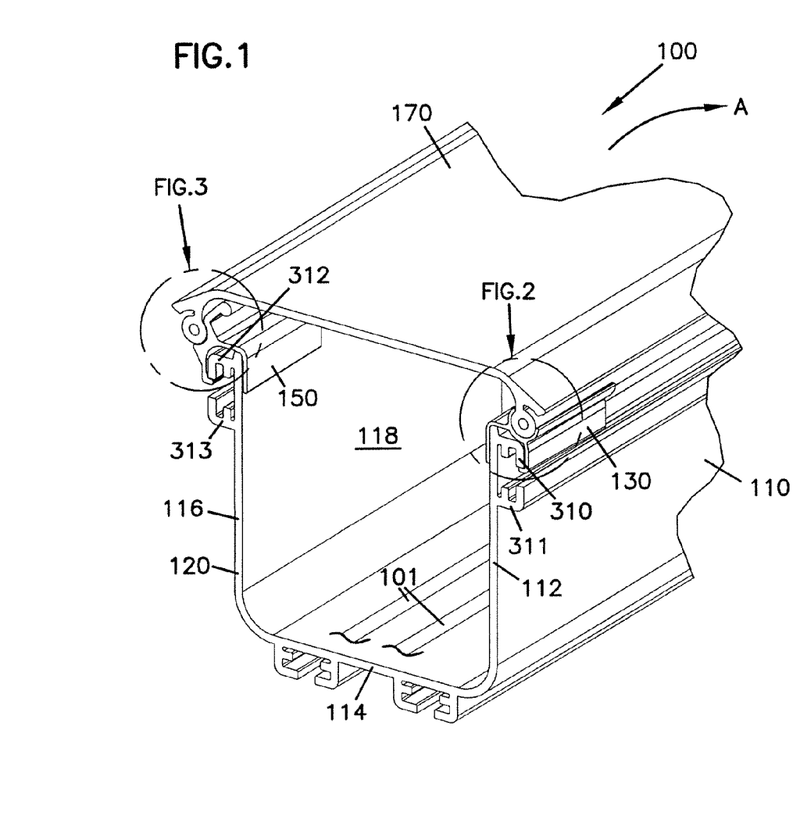
FIG. 1 is a perspective view of an embodiment of a trough system with a cover in a closed position made in accordance with the present invention.

The capture clip 150 can be coupled to the trough member 110, as shown in FIGS. 1 and 3, in a manner similar to that described above with respect to the hinge clip 130. Specifically, the capture clip 150 can be coupled to the sidewall 116 by snapping the capture clip 150 onto the sidewall 116 so that the channel 151 receives the lip 312, and the clip portion 152 extends partially into the slot 117. In alternative embodiments, the capture clip 150 can be configured to be slid onto an end, such as first end 120, and into the desired position on the trough member 110. The capture clip 150 can be removed from the trough member 110 similarly, either by forcing the clip portion 152 out of the slot 117 and then removing the capture clip 150 from the trough member 110, or, alternatively, by sliding the capture clip 150 off an end of the trough member 110.

The capture clip 150 extends from a first end 160 to a second end 162. In preferred embodiments, the length of the capture clip 150 (i.e., the distance between ends 160 and 162) is between 1 and 5 inches. In a preferred embodiment, the length is approximately 1.75 inches. The capture clip 150 is preferably molded from a plastic material such as, for example, a synthetic thermoplastic polymer such as an acrylonitrile-butadiene-styrene(ABS)/polycarbonate blend. In a preferred embodiment, the capture clip 150 is injection molded and varies in thickness from one end to the other to allow the molded clip to be stripped from the mold. Other manufacturing methods and materials can also be used.

The example cover 170, shown in more detail in FIGS. 2, 3, 5, and 11-13, includes a main body 172 having first and second ends 174 and 176. As illustrated by the depicted example, the ends 174 and 176 are preferably, but need not be, angled with respect to the main body 172. The cover 170 includes pivot members 178 and 179 at each of the first and second ends 174 and 176. Each pivot member 178 and 179 can, for example, be in the form of cylindrical bead, rod, shaft, or other similar shape including a generally round outer circumference. Grooves 173 and 175 with ends 177 are formed generally between the ends 174 and 176 and the outer circumference of the pivot members 178 and 179.

Preferably the cover 170 extends from the first sidewall 112 to the second sidewall 116 to cover the open top of the trough member 110. Depending on the width of the trough member 110, a width of the cover 170 between ends 174 and 176 can be sized to cover the open top. In preferred embodiments, the width of cover 170 is 4, 6, or 12 inches, depending on the width of the trough member. The cover 170 extends lengthwise from a first end 180 to a second end 182. In preferred embodiments, the length of the cover 170 (i.e., the distance between ends 180 and 182) is between 2 and 8 feet. In a preferred embodiment, the length is approximately 6 feet. Successive covers 170 can be used end to end to cover trough members of longer length, and a cover 170 can be cut to other desired lengths. Like the trough member 110, the cover 170 is preferably extruded from a plastic material such as, for example, a synthetic thermoplastic polymer such as an acrylonitrile-butadiene-styrene(ABS)/polycarbonate blend, although other manufacturing methods (e.g., molding) and materials can also be used.

Referring again to FIGS. 1-3, the cover 170 is illustrated in the closed position. In this position, pivot member 178 of the cover 170 is positioned in the socket 138 of the hinge clip 130. In addition, pivot member 179 of the cover 170 is positioned in the seat 156 of the capture clip 150. In this position, the cover 170 extends over the open top of the trough member 110 and thereby protects any components (e.g., fiber cables) positioned in the interior space 118 of the trough member 110 from any debris dropped on the cover 170.

The cover 170 can be pivoted from the closed position to the open position. This can be accomplished by applying force in a direction A on the second end 176 of the cover 170, which causes the pivot member 179 to be released from the seat 156 of the capture clip 150. The cover 170 can then be pivoted about the pivot member 178 in the socket 138 of the hinge clip 130 in the direction A to the open position shown in FIGS. 4 and 5.

Referring again to FIGS. 4 and 5, in the open position, the first arm 136 of the socket 138 of the hinge portion 135 is received in the groove 173 of the cover 170 to define the open position. In addition, as the first arm 136 contacts end 177 of the groove 173, the cover 170 is prevented from pivoting further in the direction A, thereby maintaining the cover 170 in the open position and the pivot member 178 in the socket 138.

Figure 2:
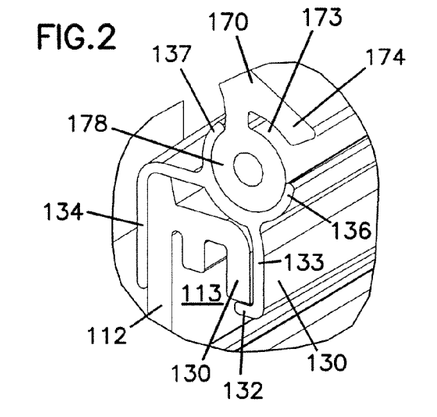
FIG. 2 is an enlarged view of a portion of the trough system shown in FIG. 1.

The cover 170 can also be pivoted once again in a direction B back to the closed position. As the cover 170 nears the closed position, the pivot member 179 contacts and rides along the ramp 155 of the capture clip 150, which directs the pivot member 179 into the seat 156. In addition, in a preferred embodiment, as the pivot member 179 rides along the ramp 155 of the capture clip 150, sidewall 116 that is coupled to the capture clip 150 bows inward slightly, allowing the pivot member 179 to clear the ramp 155 and drop into the seat 156. In this manner, a snug fit between the cover 170 and the capture clip 150 can be created, and the capture clip 150 can preferably maintain the cover 170 in the closed position. With the pivot member 179 in the seat 156, the cover 170 is once again in the closed position, as shown in FIGS. 1-3.

An example method of assembling the trough system 100 is as follows. Initially, the hinge clip 130 and the capture clip 150 are positioned on the trough member 110. This can be accomplished, as described above, preferably by snapping the hinge clip 130 and capture clip 150 onto the trough member 110 at the desired locations. Preferably, once the hinge clip 130 and capture clip 150 are positioned on the trough member 110, the clips 130 and 150 can be slid slightly with respect to the trough member 110 to further position the clips 130 and 150 as desired on the trough member 110.

Figures 21, 22:
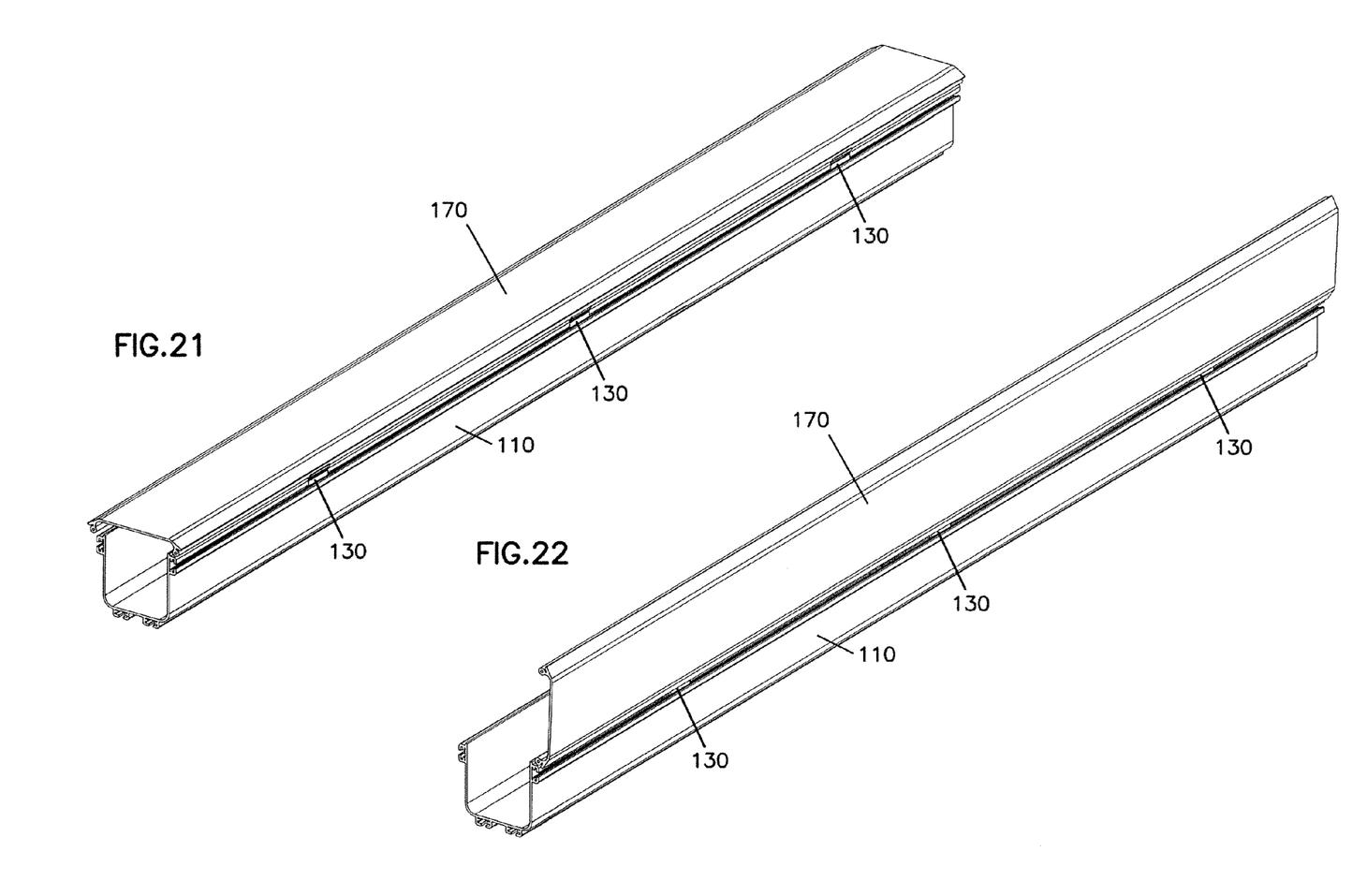
FIG. 21 is a perspective view of a trough system illustrating the entire cover of FIG. 1.
FIG. 22 is a perspective view of the trough system of FIG. 21 with the cover in an open position.
Figure 23:
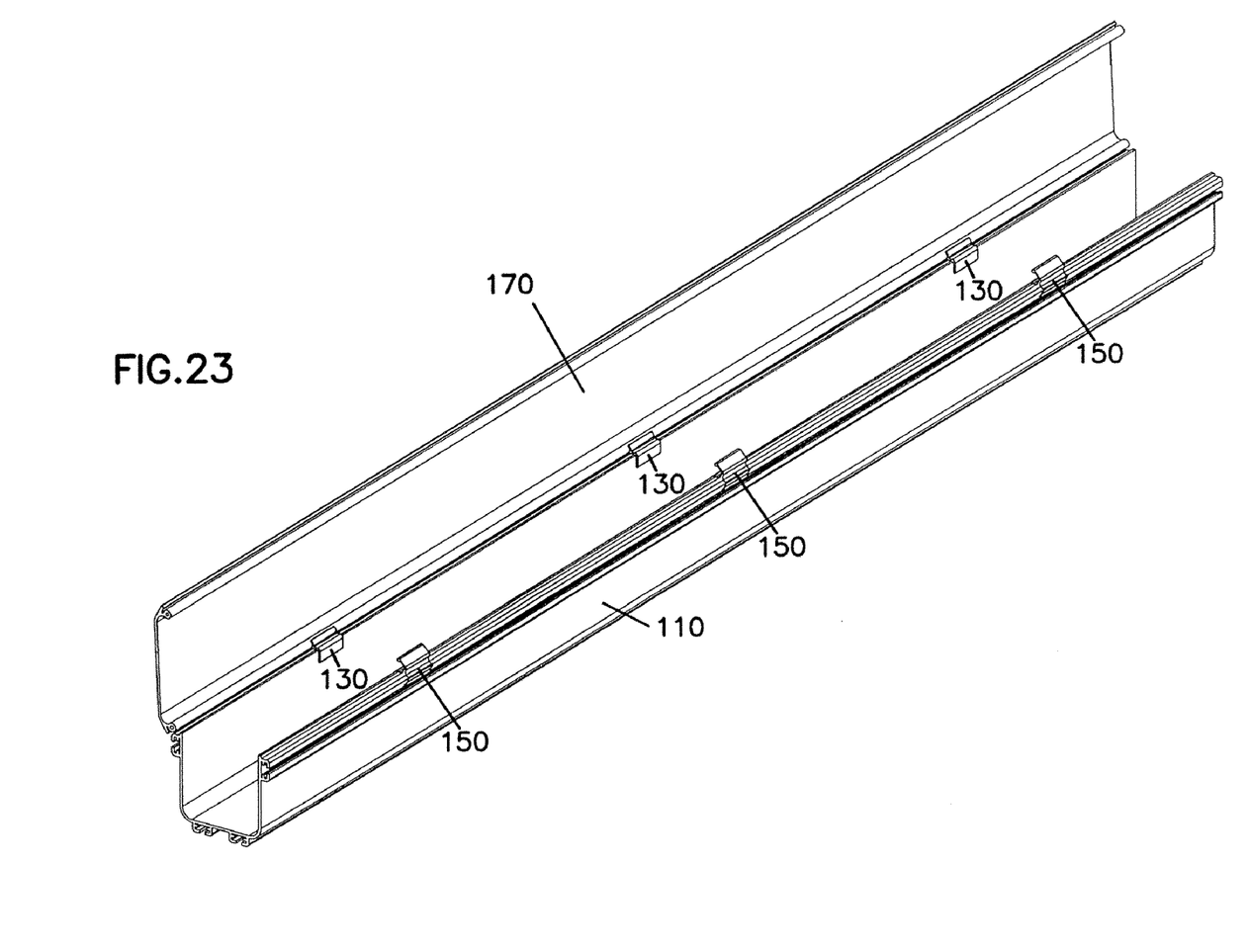
FIG. 23 is another perspective view of the trough system of FIG. 22.

In preferred embodiments, multiple hinge clips 130 and capture clips 150 are used. For example, if a 6 foot cover is to be used, preferably three hinge clips 130 and three capture clips 150 are positioned on opposite sidewalls of the trough member 110 at spaced intervals, as shown in FIGS. 21-23. More or fewer hinge and capture clips can also be used. In preferred embodiments, the hinge clips 130 and capture clips 150 are spaced at between approximately 1 and 3 feet intervals, more preferably at approximately 2 feet intervals. Each hinge clip 130 can be positioned across from each capture clip 150 (as shown in the example of FIGS. 21-23), or the clips can be staggered as desired.

Once the hinge clips 130 and capture clips 150 are positioned on the trough member 110, the cover 170 can be placed over the open top of the trough member 110, and the cover 170 can be pressed downward toward the trough member 110 to snap the pivot member 178 into the sockets 138 of the hinge clips 130 and the pivot member 179 into the seats 156 of the capture clips 150.

Once the cover 170 is coupled to the trough member 110, the cover 170 can be pivoted between the closed and open positions as described above.

Referring now to FIGS. 14-20, another example embodiment of a trough system 200 is shown. The system 200, including hinge clip 130, is similar to the system 100, with the differences noted below.

Figure 14:
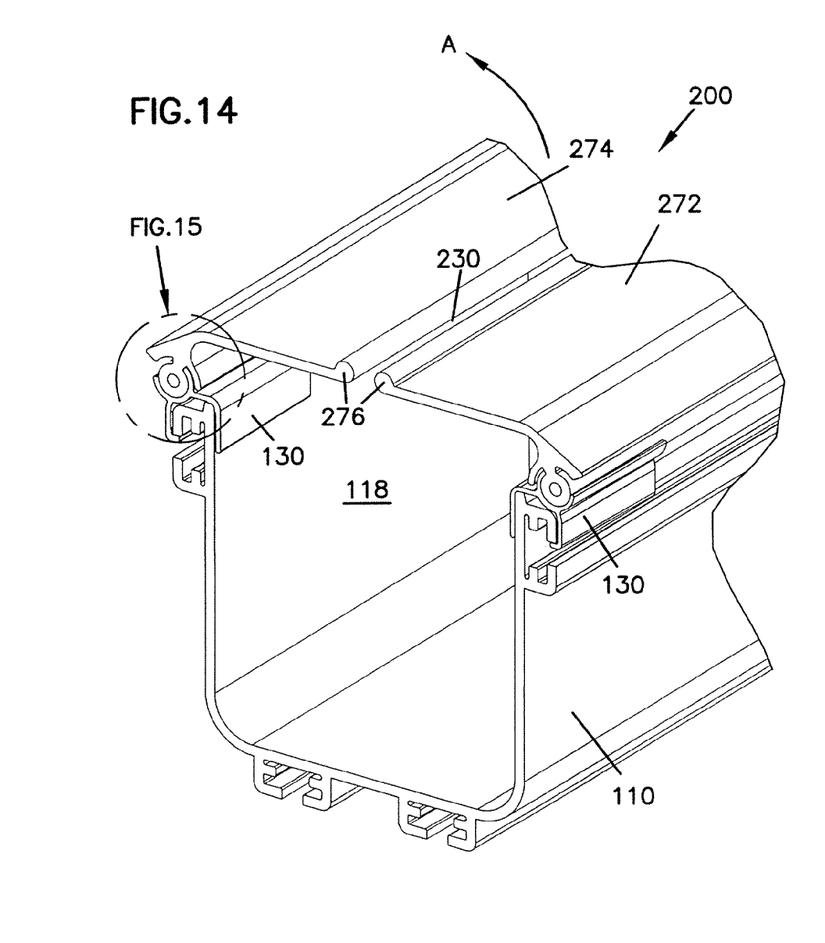
FIG. 14 is a perspective view of another embodiment of a trough system with covers in closed positions made in accordance with the present invention.

Instead of a single cover (such as cover 170 provided in system 100), a split cover including cover portions 272 and 274 is provided. As shown in FIG. 14, cover portions 272 and 274 each extend partially across the open top of the trough member 110. Although ends 276 of the cover portions 272 and 274 extend closed to one another, preferably a slot 230 is formed between ends 276, as described further below.

Figure 18:
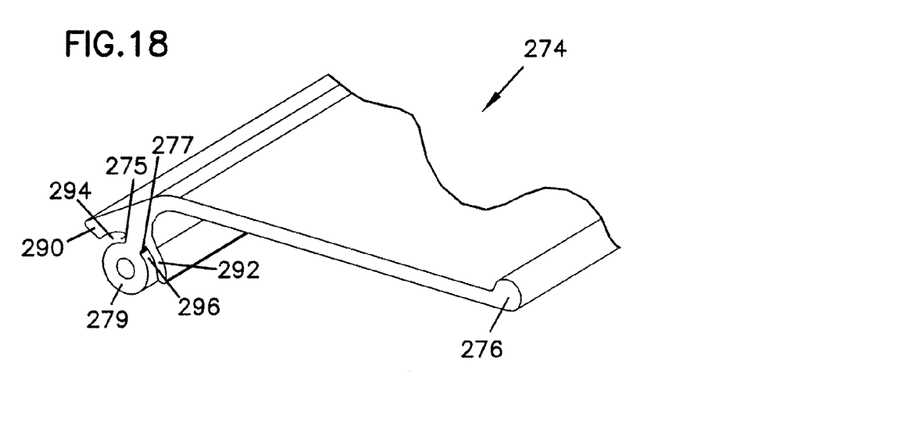
FIG. 18 is a perspective view of another embodiment of a cover made in accordance with the present invention.
Figure 19:
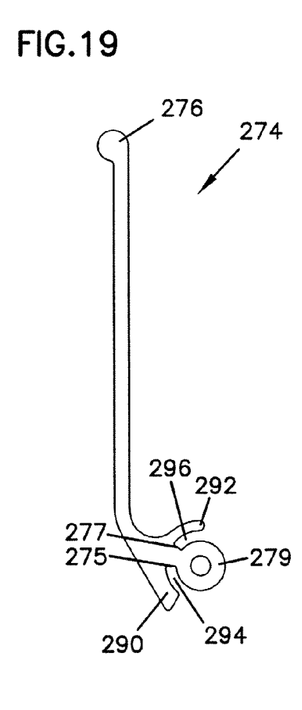
FIG. 19 is an end view of the cover of FIG. 18.
Figure 20:
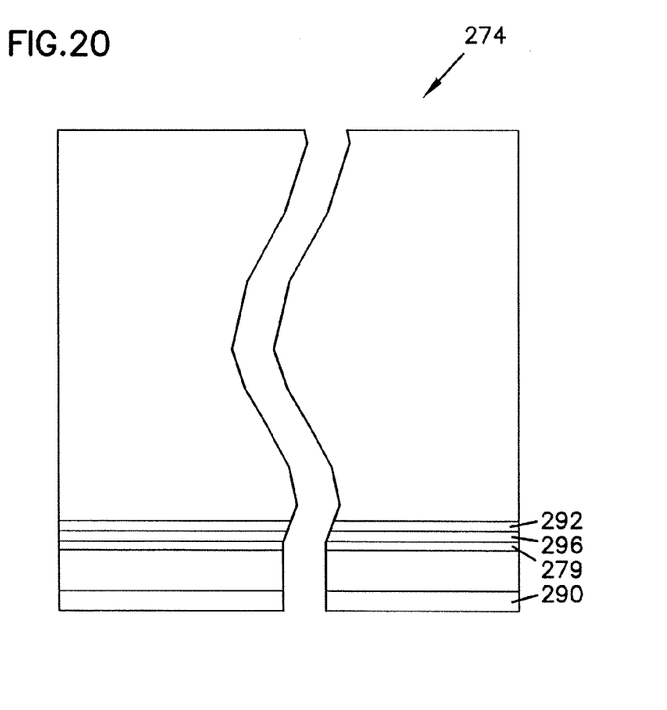
FIG. 20 is a bottom view of the cover of FIG. 18.

Referring now to FIGS. 18-20, the cover portion 274 is described in greater detail. A pivot member 279 (similar to pivot members 178 and 179) is positioned at an end 290 of the cover portion 274. In addition, a first groove 294 with end 275 is formed between an outer circumference of the pivot member 279 and the end 290 (similar to groove 173), and a second groove 296 with end 277 is formed between the pivot member 279 and a member 292.

Further, the end 276 of the cover portion 274 can be formed with a rounded surface (see FIGS. 14, 16, and 18-20) to minimize any sharp edges. This can be advantageous, for example, to minimize any wear on fiber cables if the cables are run through the slot 230 with the cover portions 272 and 274 in the closed position.

Referring again to FIGS. 14 and 15, the pivot member 279 of the cover portion 274 can be received in the socket 138 of the hinge clip 130. In the closed position as shown in FIGS. 14 and 15, the second arm 137 of the socket 138 contacts end 277 of the groove 296 to define the closed position.

Figure 16:
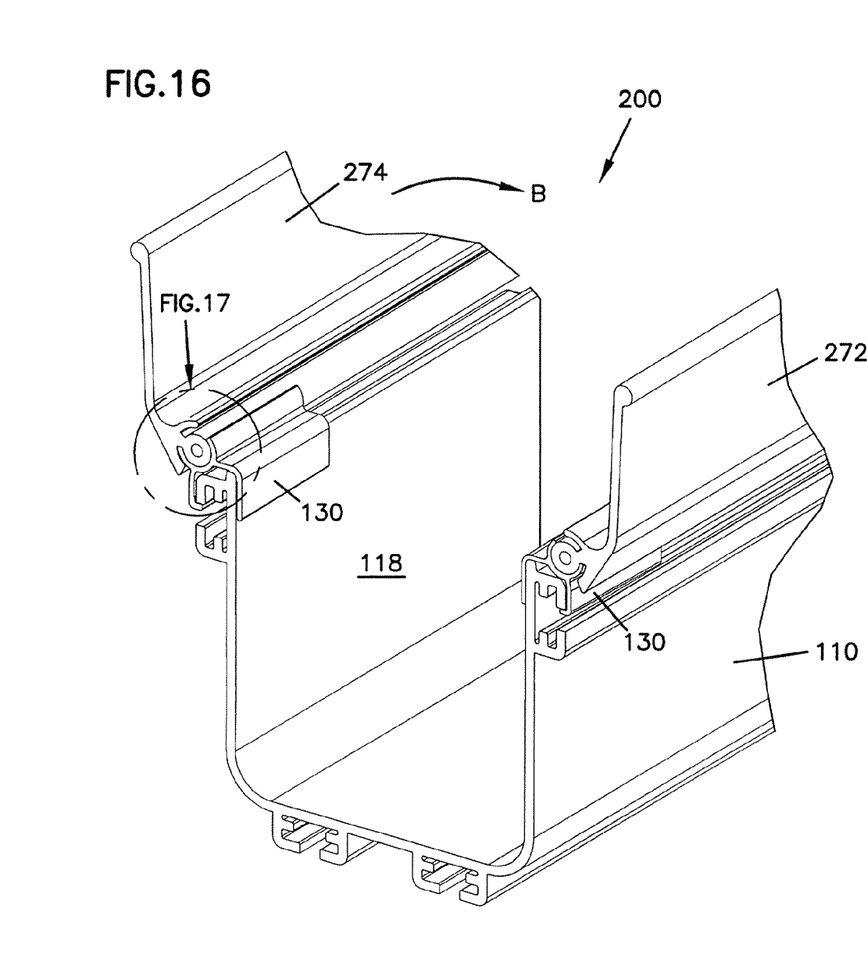
FIG. 16 is a perspective view of the trough system of FIG. 14 with the covers in open positions.
Figure 17:
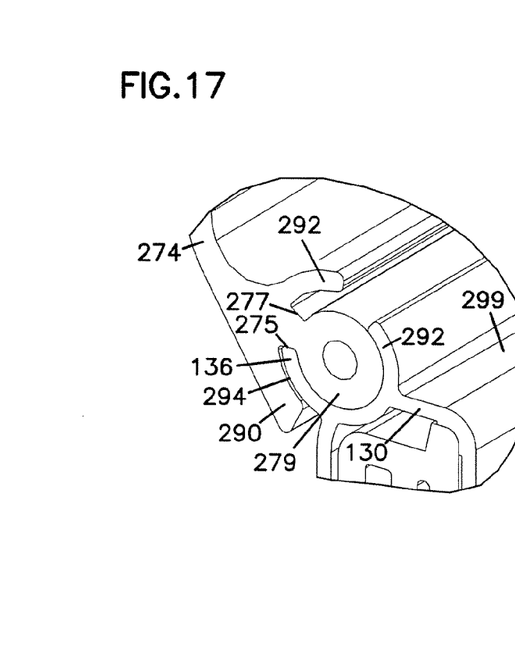
FIG. 17 is an enlarged view of a portion of the trough system shown in FIG. 16.

The cover portion 274 can be pivoted into the open position by applying force to the end 276 in the direction A. In the fully opened position, as shown in FIGS. 16 and 17, the first arm 136 of the socket 138 contacts end 275 of the groove 294 to define the open position and prevent the cover portion 274 from being pivoted further in the direction A.

The cover portion 274 can be pivoted back to the closed position by applying a force to pivot the cover portion 274 in the direction B. The cover portion 274 can be pivoted in the direction B, as described above, until the second arm 137 of the socket 138 contacts end 277 of the groove 296 in the closed position.

Figure 15:
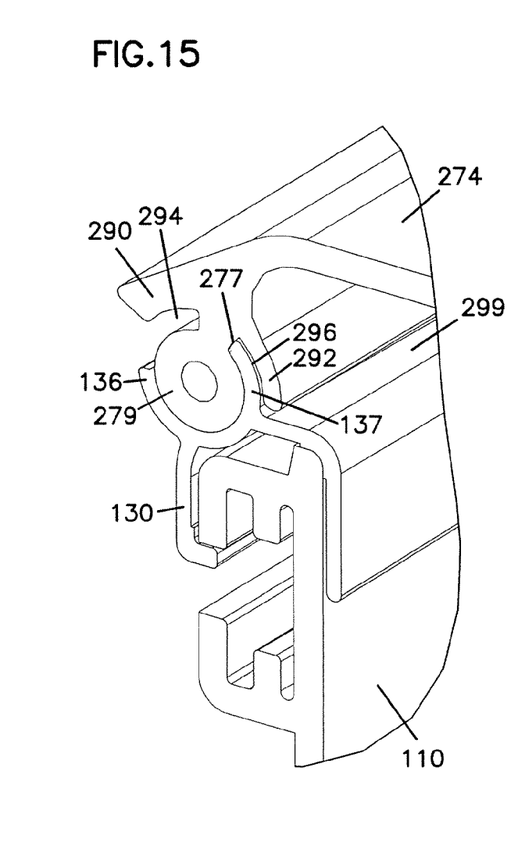
FIG. 15 is an enlarged view of a portion of the trough system shown in FIG. 14.

If, once in the close position as shown in FIGS. 14 and 15, sufficient additional force is applied to the cover portion 274 in the direction B, further pivoting of the cover portion 274 in the direction B is possible. However, this pivoting is limited as the member 292 contacts surface 299 of the hinge clip 130 (see FIG. 15), at which point further pivoting in the direction B is preferably prevented. This may be desirable, for example, should a heavy object be dropped onto the cover portion 274. Although the cover portion 274 may deform slightly in the direction B until the member 292 contacts the surface 299 of the hinge clip 130, the cover portion 274 is preferably thereupon prohibited from further pivoting in the direction B, thereby preventing the object from entering the interior space 118 of the trough member 110.

The cover portion 272 is preferably configured as a mirror image of the cover portion 274 and functions in a similar manner. As shown, no capture clip 150 is used for system 200. Instead, an additional hinge clip 130 is provided to hold the pivot member of the cover portion 272.

In preferred embodiments, the slot 230 between cover portions 272 and 274 is less than 1 inch, more preferably 0.75 inch, and even more preferably approximately 0.5 inch or less. In this configuration, the slot 230 allows limited access to the interior space 118 of the trough member 110 without requiring that any covers be opened or removed. For example, additional fibers can be introduced into the interior space 118 of the trough member 110 by insertion through the slot 230 without requiring that either cover portions 272 or 274 be opened. However, the slot 230 is preferably small enough to prevent most material from entering the interior space 118 of the trough member 110 when cover portions 272 and 274 are in the closed positions.

An example method of assembling the system 200 is as follows. First, the hinge clips 130 are positioned on the trough member 110 in a manner as described above. Then, the pivot members 279 of each of the cover portions 272 and 274 are inserted into the sockets 138 of the hinge clips 130 to couple the cover portions 272 and 274 to the trough member 110.

Each cover portion 272 and 274 can be opened and closed separately or in unison as described above.

The example cable trough systems 100 and 200 can exhibit a variety of advantages. For example, the hinge and capture clips can be coupled to existing trough members to allow pivoting covers to be added the trough members.

For example, the hinge and capture clips are preferably configured to snap onto the trough member without requiring the clips to be slid onto the trough member, and without requiring additional hardware such as screws or bolts to hold the clips in place on the trough member. However, in alternative embodiments, additional hardware can be used to, for example, lock the hinge and capture clips in place on the trough member. In other embodiments, the hinge and/or capture clips can be formed as an integral part of the trough member.

In addition, the cover is preferably configured to be easily snapped onto the hinge and capture clips without requiring the cover to be slid through the clips. This can be advantageous so that the cover can be easily coupled to the trough member.

The systems 100 and 200 described above can also be advantageous in that they can be configured to meet a variety of standards associated with cable trough systems. For example, the hinge and capture clips can be configured to hold the covers disclosed herein in close proximity to upper ends of the sidewalls of the trough member such that a 0.125 inch probe cannot be inserted into the interior space of the trough member, as required by UL Specification 60950, Safety of Information Technology Equipment.

In addition, the slot formed between the cover portions of system 200 can be sized to allow access to the interior space of the trough member while preventing most debris from entering. For example, a slot of approximately 0.5 inch between cover portions can prevent the handle of a typically-sized screw driver from entering the interior space of the trough member when dropped on the closed cover portions, while still allowing fiber cables to be run into the interior space without requiring the covers to be opened.

Additionally, the systems 100 and 200 can be advantageous in that the covers can be snapped or propped in the closed position and propped into the open position without requiring additional components beyond the hinge clips (and preferably capture clips for system 100) to be added to either the sidewalls or interior space of the trough member.

Referring now to FIGS. 24 through 28, another example embodiment of a hinge clip 300 in a trough system 350 is shown. The hinge clip 300 includes first and second members 333, 334, creating a channel 331 to receive the sidewall 112 of the trough member 110. The hinge clip 300 includes first and second arms 336, 337 creating a socket 338. The channel 331 mounts the hinge clip 300 to the sidewall 112 of the trough member 110. The socket 338 mounts the cover portion 272 to the hinge clip 300. The functions of the channel 331 and the socket 338 are the same as the channel 131 and the socket 138 for the hinge clip 130 noted above.

Figure 24:
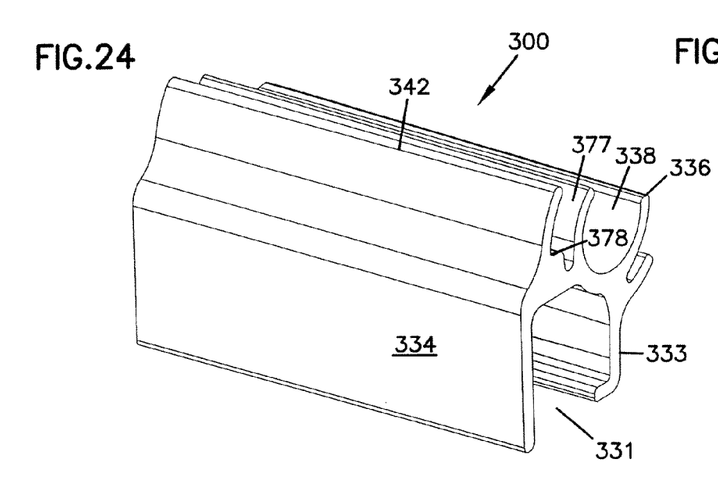
FIG. 24 is a first perspective view of an alternative embodiment of a hinge clip.
Figure 25:
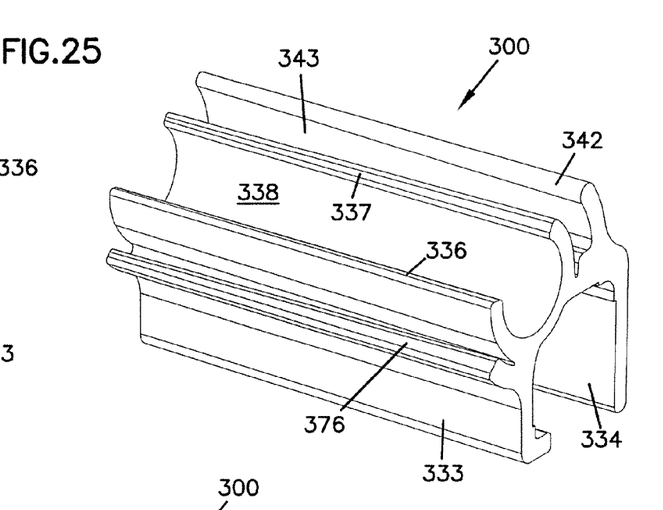
FIG. 25 is a second perspective view of the hinge clip of FIG. 24.
Figure 26:
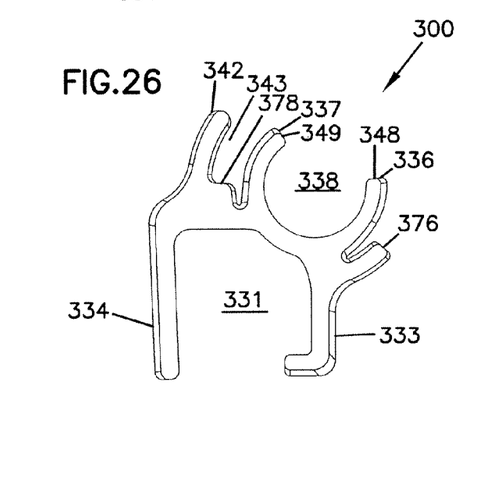
FIG. 26 is an end view of the hinge clip of FIG. 24.
Figure 27:
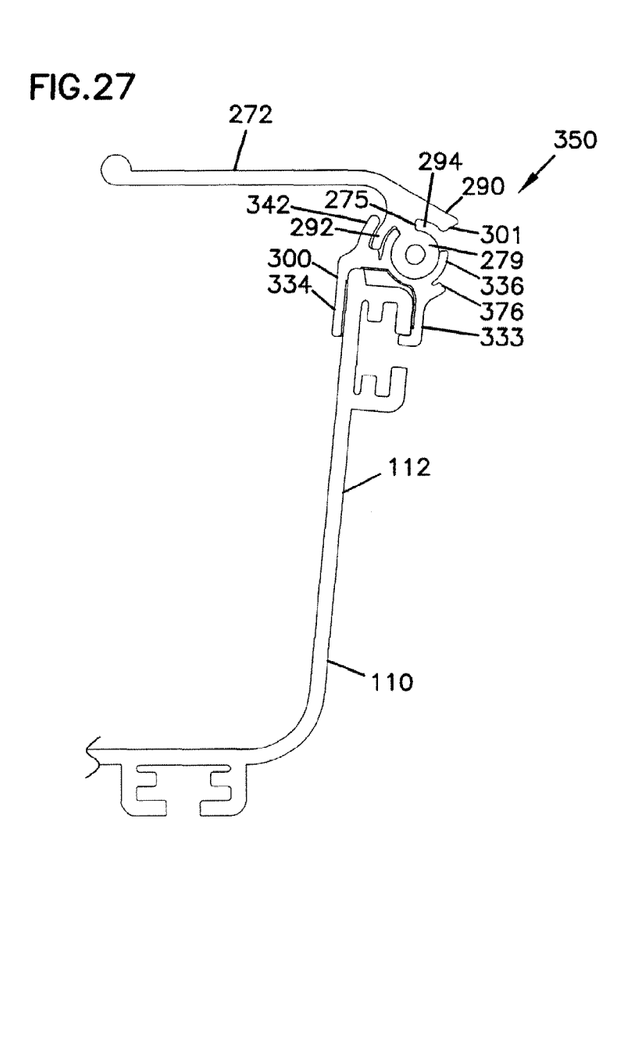
FIG. 27 is an end view of a portion of a trough system including the hinge clip of FIGS. 24 through 26, and showing the cover in the closed position.
Figure 28:
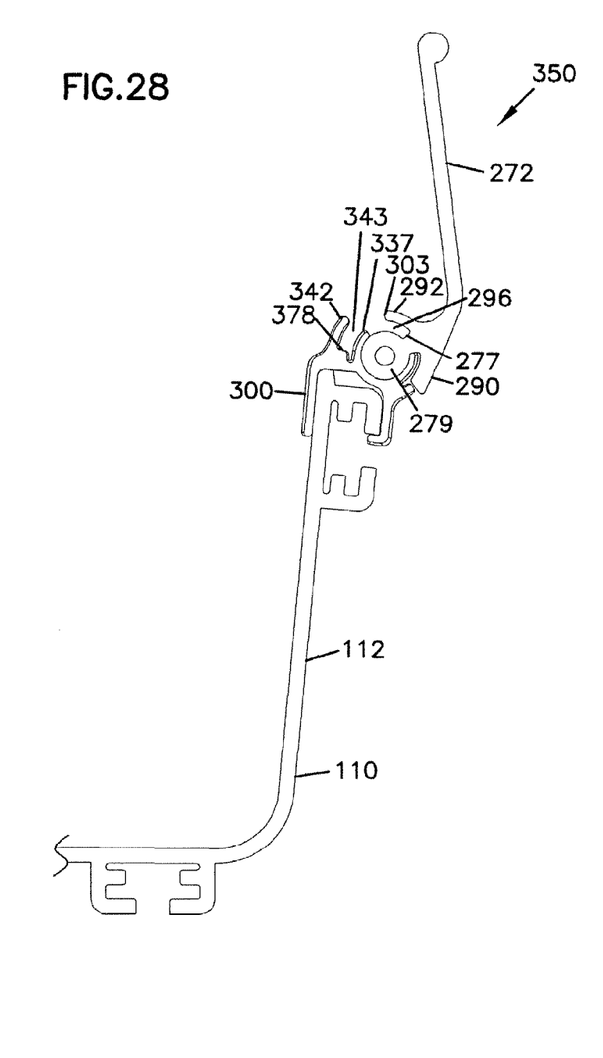
FIG. 28 shows an end view of a portion of a trough system like the system of FIG. 27, with the cover in the open position.

Adjacent to the first arm 336 is a first landing 376 for use in limiting rotation of the cover portion 272 beyond the fully open position. Adjacent to the second arm 337 is a second landing 378 for use in limiting rotation of the cover portion 272 beyond the closed position. The end 290 of the cover portion 272 defines a projection with an end 301 which engages the first landing 376 to limit the amount of opening of the cover portion 272. The member 292 on the cover portion 272 has an end 303 which engages the second landing 378 to limit the amount of closing of the cover portion 272.

The ends 348, 349 of the first and second arms 336, 337 are received in similar grooves 294, 296 in the cover portion 272 as for the hinge clip 130. In the preferred embodiment, the ends 348, 349 bottom out in the grooves 294, 296 at the same time or about the same time as the ends 301, 303 of the cover portion 272 bottom out on the first and second landings 376, 378.

The hinge clip 300 further includes a third arm 342 which creates a spacing 343 between the third arm 342 and the second arm 337. The spacing 343 receives the member 292 of the cover portion 272. The spacing 343 captures the member 292 when the cover portion 272 is closed. In the preferred embodiment, the spacing 343 and the member 292 are curved. The third arm 342 helps prevent the pivot member 279 from lifting out of the socket 338, such as may tend to occur for larger or heavier cover portions 272 when the cover portion is in the closed position.

The above specification, examples and data provide a complete description of the manufacture and of the invention. Since many embodiments of the invention can be made without departing from the spirit and scope of the invention, the invention resides in the claims hereinafter appended.

What is claimed is:

1. A cover and hinge assembly for covering a trough member having a base and two sidewalls, the assembly comprising:
   a hinge clip configured to be coupled to a first sidewall of a trough member, the hinge clip including a hinge portion having first and second arms defining a socket, and a third arm spaced from the second arm to define a spacing, and a landing positioned in the spacing; and
   a cover including a main body having first and second ends, the cover including a pivot member at the first end and defining a first groove at the first end wherein the first groove is defined between an outer circumference of the pivot member and a projection extending away from the main body of the cover, and the outer circumference of the pivot member and a member extending from the cover define a second groove;
   wherein the pivot member is received in the socket of the hinge clip to allow the cover to be pivoted about the pivot member from an open position to a closed position;
   wherein the first arm of the socket is received in the first groove of the cover, and an end of the first arm engages an end of the first groove when the cover is in the open position; and
   wherein the second arm of the socket is received in the second groove of the cover, an end of the second arm engages an end of the second groove, the spacing between the second and third arms receives the member of the cover, and an end of the member engages the landing when the cover is in the closed position.

2. The assembly of claim 1, wherein an end of the projection engages a second landing on the hinge clip when the cover is in the open position.

3. The assembly of claim 1, wherein the hinge clip includes first and second members defining a channel configured to receive a portion of the first sidewall of the trough member to couple the hinge clip to the first sidewall.

4. The assembly of claim 1, wherein a width of the cover is sized to extend over only a portion of an open top defined by the trough member.

* * * * *